US006935666B2

(12) United States Patent
Muramatsu et al.

(10) Patent No.: US 6,935,666 B2
(45) Date of Patent: Aug. 30, 2005

(54) GRIPPER AND METHOD OF MANUFACTURING THE GRIPPER

(75) Inventors: Naoki Muramatsu, Tokyo (JP); Tomoyoshi Tada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 181 days.

(21) Appl. No.: 10/296,813

(22) PCT Filed: Mar. 30, 2001

(86) PCT No.: PCT/JP01/02791

§ 371 (c)(1),
(2), (4) Date: Nov. 27, 2002

(87) PCT Pub. No.: WO02/081364

PCT Pub. Date: Oct. 17, 2002

(65) Prior Publication Data

US 2003/0111855 A1 Jun. 19, 2003

(51) Int. Cl.[7] .............................. B25J 7/00; B25J 15/08
(52) U.S. Cl. ........................ 294/99.1; 294/86.4; 901/36
(58) Field of Search ................................ 294/1.1, 86.4, 294/99.1, 100, 65.5; 901/30, 31, 36, 40, 45

(56) References Cited

U.S. PATENT DOCUMENTS 5,020,964 A * 6/1991 Hyatt et al. ................. 198/375
5,651,574 A * 7/1997 Tanikawa et al. .......... 294/86.4
5,884,951 A * 3/1999 Long et al. ................. 294/86.4

FOREIGN PATENT DOCUMENTS

| JP | 59-59382 | 4/1984 |
| JP | 5-293778 | 11/1993 |
| JP | 11-260480 | 9/1999 |
| WO | WO 99/30877 | 6/1999 |
| WO | WO 00/245999 | 8/2000 |

* cited by examiner

Primary Examiner—Dean J. Kramer
(74) Attorney, Agent, or Firm—Sughrue Mion, PLLC (57) ABSTRACT

The present invention is a gripper comprising a motor 12 for driving a connecting nut 126 that is translated, a gripping finger 103 having at least two sides of substantial V shape and a shared portion 103g for joining one ends of the two sides, and provided with the other ends of the sides, a base member 110 with a notch 110c for engaging the other end portion of the gripping member 103, a holder member 145 having a groove 145e for engaging the base member 110 detachably and the hollow portions 145m and 145h that are penetrated, and a magnetic member 128 composed of a permanent magnet inserted into the hollow portions 145m and 145h of the holder member 145, with one end connected to the connecting nut 126, and the other end magnetically connected to the shared portion 103g of the gripping finger 103.

11 Claims, 8 Drawing Sheets

GRIPPER AND METHOD OF MANUFACTURING THE GRIPPER

TECHNICAL FIELD

The present invention relates to a gripper for use in conveying or assembling a minute part with improvements in replacement operation of a gripping finger.

BACKGROUND ART

Figure 10:
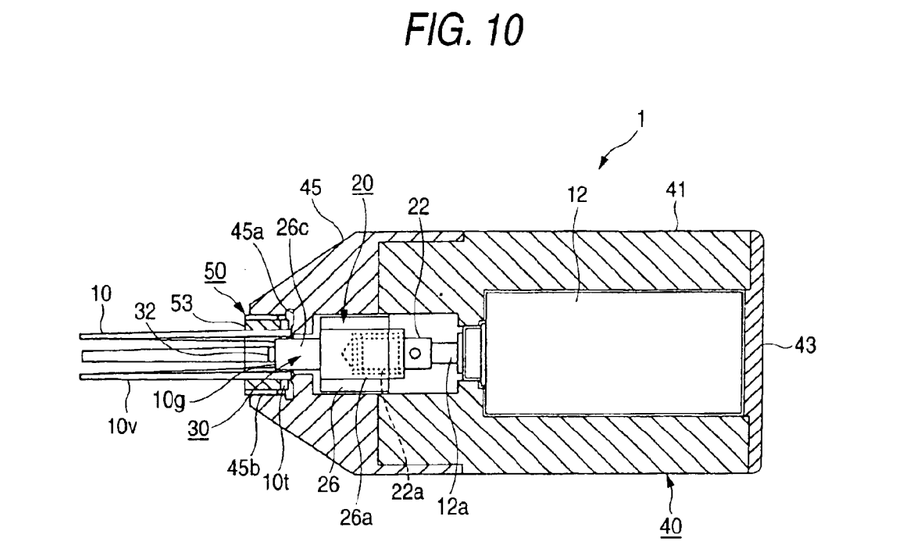
FIG. 10 is a front cross-sectional view showing the conventional gripper.

A conventional gripper will be described below with reference to FIG. 10 as disclosed in the International Publication Number WO00/45999. In FIG. 10, the gripper 1 has a gripping finger 10 for gripping or releasing a minute object and having three V-character pieces 10v of substantial V shape, a conversion portion 20 for converting the rotation of a motor shaft 12a of a motor 12 into translation motion, the conversion portion 20 being connected to a shared portion 10g of the gripping finger 10, a connection portion 30 for connecting the conversion portion 20 and the shared portion 10g of the gripping finger 10, a case portion 40 for accommodating the motor 12, the conversion portion 20 and the connection portion 30, and a fixing portion 50 for fixing a fixing pawl 10t of the gripping finger 10 to the case portion 40.

The conversion portion 20 comprises a screw axis 22 for fitting and securing the motor shaft 12a of the motor 12 and having a male screw 22a around the outer circumference thereof, and a nut 26 for inserting the screw axis 22 and having a hollow portion formed with a female screw 26a to be mated with the male screw 22a, in which the rotation of the motor shaft 12a of the motor 12 is converted into translation motion of the nut 26.

The connection portion 30 is formed with a protruding portion 26c having a tapped hole centrally at the top end of the nut 26, in which the shared portion 10g of the gripping finger 10 is secured into this tapped hole by a screw 32.

The case portion 40 is formed of a cylindrical case 41 for receiving the motor 12 and a part of the screw axis 22, a lid 43 for closing a right end face of the case 41, and a holder member 45 engaged with a left end face of the case 41, in which the holder member 45 is like a barrel having a through hole, with a substantially trapezoidal shape in cross section, and has a female screw 45b on the outer face of a hollow portion 45a at the top end.

The fixing portion 50 is formed with a male screw for mating with the female screw 45b of the holder member 45 on an external circumferential face of a cylindrical presser ring 53. The fixing pawl 10t of the gripping finger 10 abuts onto the hollow portion 45a of the holder member 45, and the fixing portion 50 is securely pressed by the presser ring 53.

Referring to FIG. 10, the operation of the gripper as constituted above will be described below. First of all, the motor 12 is powered on, and then the motor shaft 12a of the motor 12 is rotated, so that this rotation is transmitted via the screw axis 22 to the nut 26 to move the nut 26 in a right direction as indicated in FIG. 10.

Along with this, the shared portion 10g of the gripping finger 10 is forcibly displaced by the same amount of displacement in the same direction, and the gripping finger 10 is subjected to a bending moment, so that the V-character pieces are bent at the top end portion in the direction coming closer to each other and closed to grip an object.

On the contrary, if the rotation of the motor 12 is reversed, with this rotation, the nut 26 is translated via the screw axis 22 in a reverse direction, and the shared portion 10g of the gripping finger 10 is also translated by the same amount of displacement in the consistent manner, so that the top end portions of the gripping finger 10 release the object.

However, if the gripping object of the gripping finger 10 is spherical, the gripping finger 10 maybe composed of three fingers as above described, but if the object is like a square pole, the gripping finger must be composed of two fingers (not shown) to grip the object appropriately. Also, the gripping finger 10 must be exchanged due to expiration of life, if a predetermined number of operation times is exceeded.

Such an exchange is perform in such a way that the screw 32 is firstly turned by a screwdriver (not shown) to release engagement of the protruding portion 26c of the nut 26 into the tapped hole, and then the presser ring 53 is turned by a spanner (not shown) to unscrew the holder member 45 from the female screw 45b, thereby detaching the gripping finger 10.

In order to attach the gripping finger 10 on the holder member 45, the screw 32 is tightened into the tapped hole of the protruding portion 26c by the screwdriver, the presser ring 53 is turned by the spanner and mated with the female screw 45b of the holder member 45. Thus, there was a problem that the exchange operation of the gripping member 10 was troublesome.

In addition, in the case where the gripper 1 is employed for an end effector of a robot, and particularly is attached vertically downward at the top end portion of a scalar robot to be actuated horizontally, the gripper 1 can not be disposed sideways or upward, resulting in a problem that the exchange operation of the gripping finger 10 alone was troublesome.

This invention is aimed at providing a gripper and its manufacturing method in which a gripping member is easily attached.

SUMMARY OF THE INVENTION

A gripper according to a first invention comprises an actuator for actuating a movement portion which translates, a gripping member having at least two sides of substantial V shape, a shared portion for joining one ends of said two sides, and the other ends of said sides, a holder member having a base member including a first engagement portion for engaging the other ends of said gripping member thereto, a second engagement portion for engaging said base member detachably thereto, and a hollow portion, which is penetrated, and a magnetic member made of a permanent magnet, the magnetic member one end of which is connected to one end of said movement portion, the magnetic member the other end of which is magnetically connected to the shared portion of said gripping member, the magnetic member inserted into said hollow portion of said holder member.

With this constitution of the gripper, the other end portion of the gripping member is engaged with the first engagement portion of the base member, the base member is engaged with the second engagement portion of the holder member, and the shared portion of the gripping member is magnetically connected to the other end of the magnetic member, whereby the gripping member can be engaged with the base member, and the base member attached to the holder member in simple manner.

Further, the base member attached to the holder member is disengaged from the second engagement portion of the holder member, and the shared portion of the gripping member is removed from the other end of the magnetic member by pulling it with a stronger force than a magnetic adsorption of the magnetic member. Accordingly, there is the effect that the base member having the gripping member can be easily removed from the holder member.

A gripper according to a second invention comprises an actuator for actuating a movement portion which translates, a gripping member having at least two sides of substantial V shape, a shared portion for joining one ends of said two sides, and the other ends of said sides, a base member having a bore punched in the central portion thereof, an engagement portion for engaging an end portion of said gripping member thereto, and at least two protrusion pieces around outer circumference, a holder member having at least two grooves for engaging said protrusion pieces of said base member detachably therewith, and a hollow portion, which is penetrated, a magnetic member made of a permanent magnet, the magnetic member inserted into said hollow portion of said holder member, the magnetic member one end of which is connected to said movement portion, and a connection member one end of which is adsorbed magnetically to the other end of said magnetic member, the connection member the other end of which is connected to the shared portion of said gripping member, the connection member inserted into said hollow portion of said holder member.

With this constitution of the gripper, the end portion of the gripping member is engaged with the engagement portion of the base member, the protrusion piece of the base member is engaged with the groove of the holder member, and the shared portion of the gripping member is connected to the other end of the connection member, whereby the gripping member and the base member are attached to the connection member and the holder member, respectively.

The protrusion piece of the base member is removed from the groove of the holder member, and the shared portion of the gripping member is pulled to detach one end of the connection member from the other end of the magnetic member, whereby the gripping member and the base member are removed from the connection member and the holder member, respectively. Accordingly, there is the effect that the gripping member and the base member can be easily removed from the connection member and the holder member, respectively.

For example, if the protrusion piece of the base member is engaged in the groove provided on the side face of the cylindrical member having the hollow portion into which the gripping member can be inserted in a state where the base member is attached to the holder member, the protrusion piece of the base member is easily removed from the groove of the holder member.

The gripper according to a third invention is characterized in that a first slit is defined at the other end portion of said gripping member.

With the constitution of the gripper, there is the effect that if the operator depresses an end portion of the gripping member, for example, the end portion is compressed owing to a spring action, and can be easily engaged with the engagement portion of the base member.

The gripper according to a fourth invention is characterized in that said connection member has a tapped hole at the other end portion thereof, and the screw member is inserted into a bore of the shared portion of said gripping member and is tightened into the tapped hole of said connection member.

With the constitution of the gripper, there is the effect that the shared portion of the gripping member can be simply attached to or detached from the connection member by means of the screw member.

The gripper according to a fifth invention is characterized in that said screw member is cylindrical, and further comprises a head portion formed a minus signal shaped or plus signal shaped groove, a screw portion tightened into the tapped hole of said connection member, and a screw preventing portion having a diameter larger than said screw portion and smaller than said head portion and having a length greater than the thickness of said shared portion of said gripping member, said screw preventing portion provided between said head portion and said screw portion.

With the constitution of the gripper, when the screw member is inserted into the bore of the gripping member, and tightened into the tapped hole of the connection member by a screwdriver, for example, the screw preventing portion prevents the threaded portion of the screw member from proceeding. Accordingly, there is the effect that the gripping member is kept from being deformed due to tightening the screw member beyond the tolerance.

The gripper according to a sixth invention is characterized in that said protrusion pieces of said base member define second slits.

With the constitution of the gripper, when the protrusion piece of the base member with the gripping member is inserted into the groove of the holder member, the protrusion piece acts as a compression spring owing to the second slit provided in the base member.

Accordingly, there is the effect that the protrusion piece of the base member with the gripping member is easily inserted into the groove of the holder member.

The gripper according to a seventh invention is characterized in that said shared portion of said gripping member has a slip-off prevention piece having a larger diameter than the diameter of the bore of said base member.

With the constitution of the gripper, when the base member is pulled out of the holder member, the slip-off prevention piece of the gripping member abuts against an upper portion of the inner circumferential face of the base member at a predetermined displacement, even though the shared portion of the base member is pulled. Thus, there is the effect that the shared portion of the gripping member is restrained in the amount of movement, thereby preventing the sides of the gripping member from being contacted and pressed against each other, and being deformed.

Also, there is the same effect when the gripping member is pulled and detached, because the slip-off prevention piece of the gripping member abuts against an upper portion of the inner circumferential face of the base member A method for manufacturing the gripper according to an eighth invention includes the steps of engaging the protrusion pieces of said base member with a engagement bore of said holder member by pressing side surfaces of the protrusion pieces of said base member with a first groove provided on a side face portion of a cylindrical member having a hollow portion into which said gripping member can be inserted.

Accordingly, the protrusion piece of the base member can be simply engaged into the engagement hole of the holder member, whereby there is the effect that the base member is easily attached on the holder member.

BEST MODE FOR CARRYING OUT THE INVENTION

The preferred embodiments of the present invention will be described below.

Embodiment 1

Figure 1:
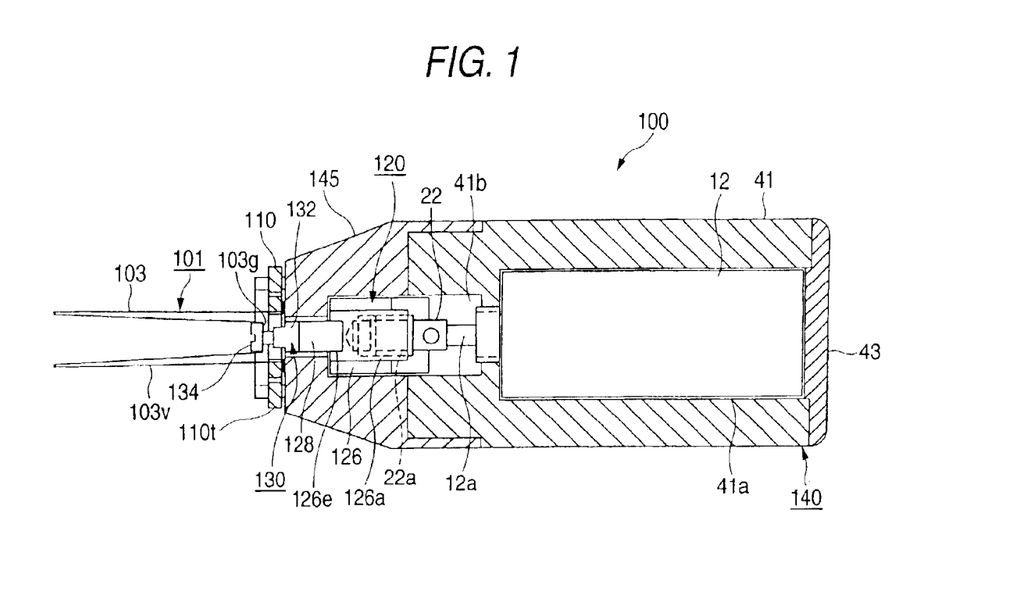
FIG. 1 is a front cross-sectional view showing the constitution of a gripper.
Figure 2:
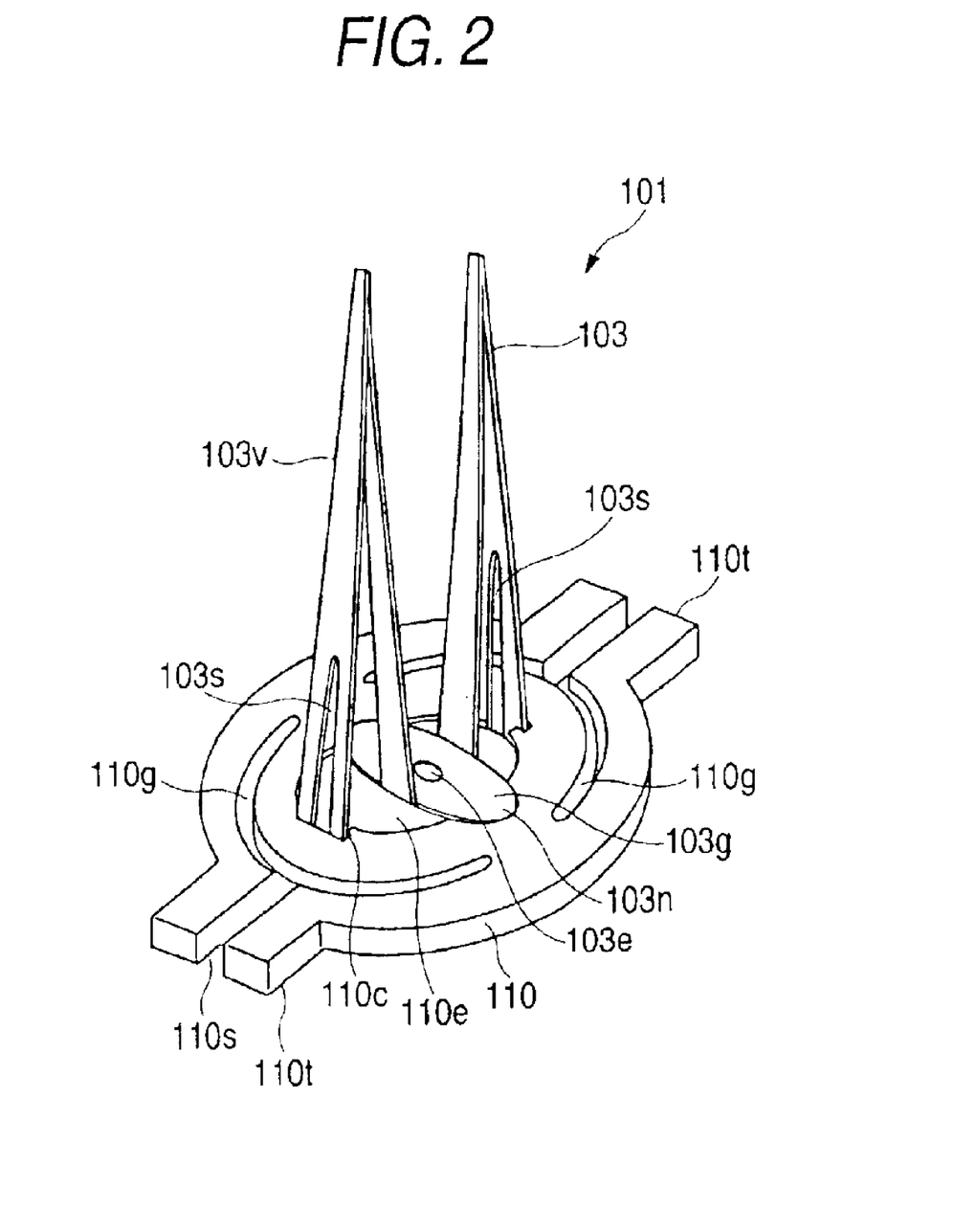
FIG. 2 is a perspective view of a finger unit as shown in FIG. 1.
Figure 3:
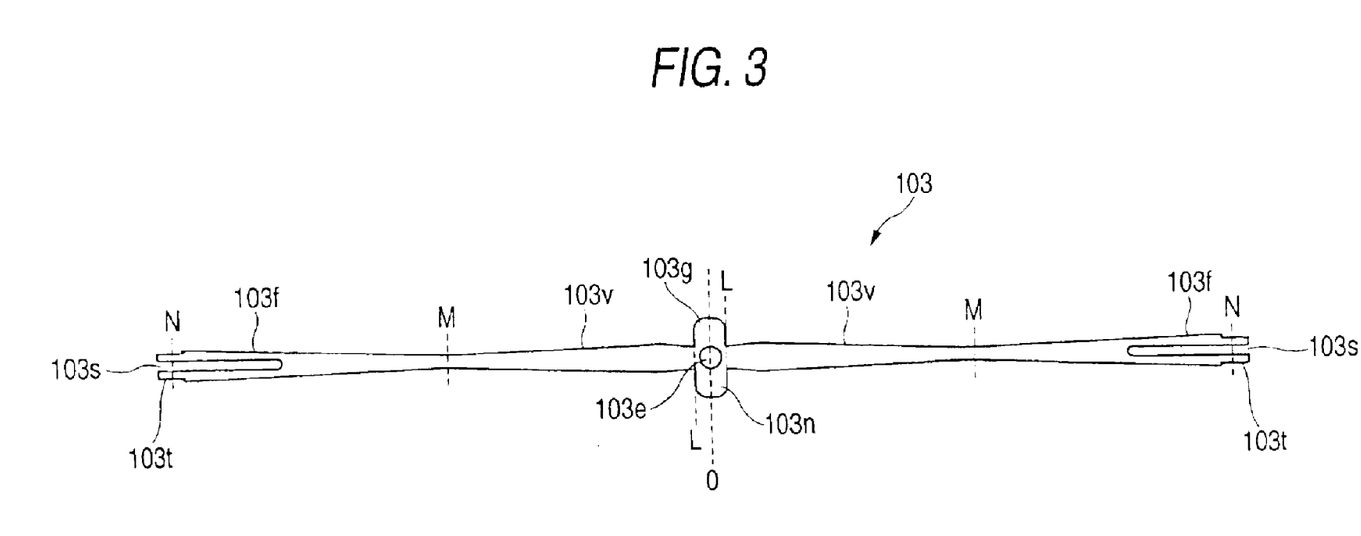
FIG. 3 is a plan view showing a state where a gripping finger of FIG. 1 is expanded.
Figure 4:
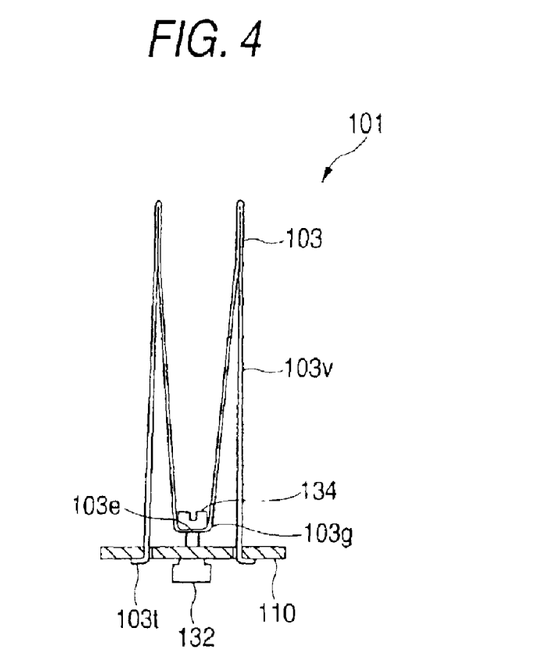
FIG. 4 is a front cross-sectional view showing the finger unit and a part of a connection portion as shown in FIG. 1.
Figure 5:
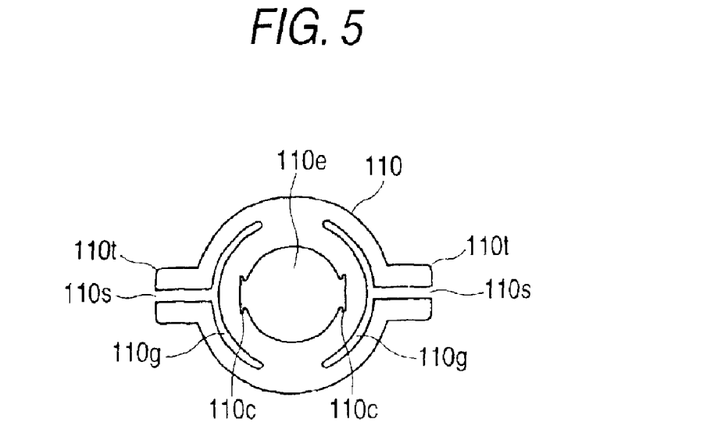
FIG. 5 is a plan view showing a base member for fixing an end portion of the gripping finger of FIG. 1.
Figure 6A:
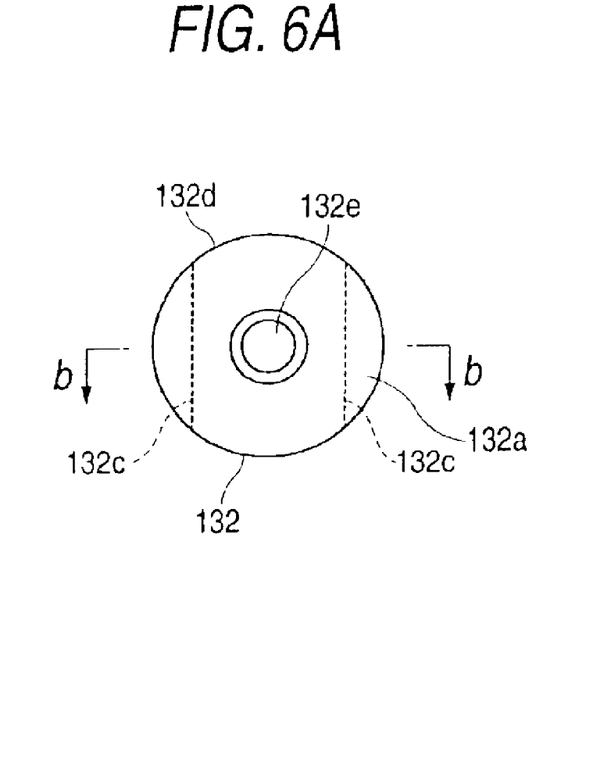
FIG. 6A is a plan view of a connecting nut as shown in FIG. 1.
Figure 6B:
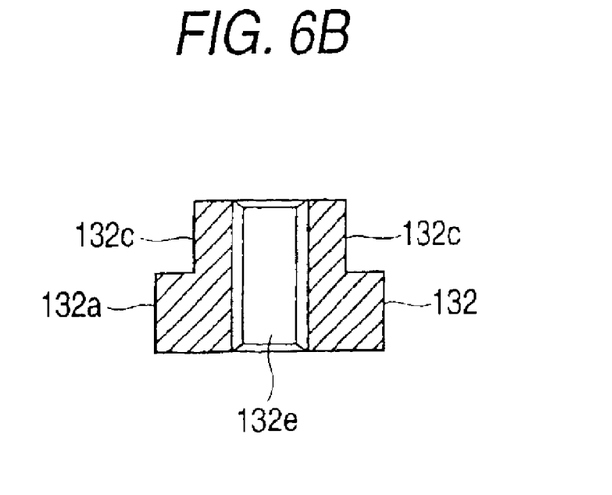
FIG. 6B is a front cross-sectional view of the connecting nut, taken along the arrow b—b in FIG. 6A.
Figure 7:
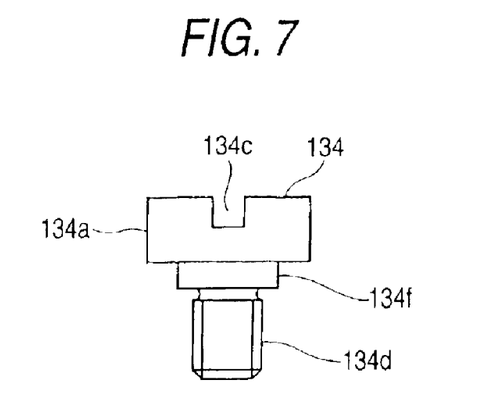
FIG. 7 is a front view of a center screw as shown in FIG. 1.
Figure 8:
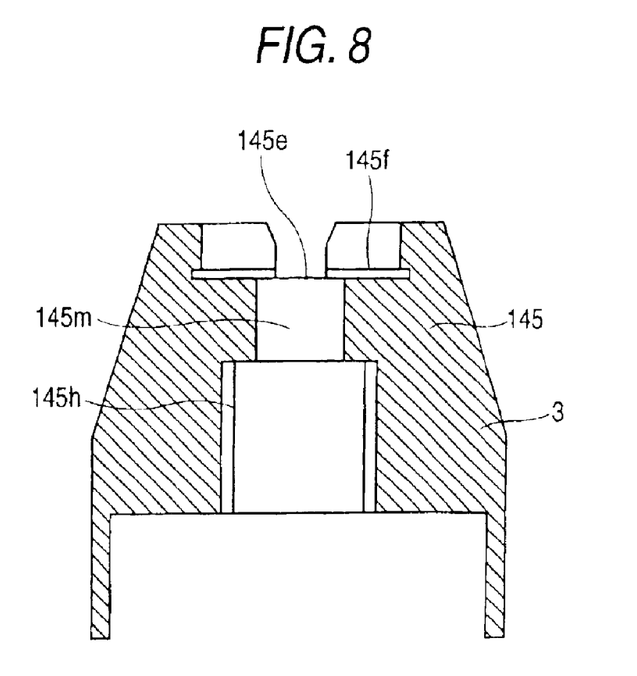
FIG. 8 is a front cross-sectional view of a holder member as shown in FIG. 1.

Referring to FIGS. 1 to 8, an embodiment 1 of this invention will be described below. FIG. 1 is a front cross-sectional view showing the constitution of a gripper. FIG. 2 is a perspective view of a finger unit. FIG. 3 is a plan view showing a state where a gripping finger is expanded. FIG. 4 is a front cross-sectional view showing the finger unit and a part of a connection portion. FIG. 5 is a plan view showing a base member for fixing an end portion of the gripping finger. FIG. 6A is a plan view of a connecting nut. FIG. 6B is a front cross-sectional view of the connecting nut taken along an arrow b—b in FIG. 6A. FIG. 7 is a front view of a center screw. FIG. 8 is a front cross-sectional view of a holder member.

In FIG. 1, the same or like parts are designated by the same numerals as in FIG. 10. The description of those parts is omitted.

In FIGS. 1 to 8, a gripper 100 has a finger unit 101, a motor 12 as an actuator connected to a shared portion 103g of a gripping finger 103 and having a shaft 12a for translating the shared portion 103g, a conversion portion 120 for converting the rotation of the shaft 12a of the motor 12 into translation motion, a connection portion 130 connected to the conversion portion 120 and the shared portion 103g of the gripping finger 103, and a case portion 140 for accommodating the motor 12, the conversion portion 120 and the connection portion 130 and fixing the finger unit 101.

The finger unit 101 has the gripping finger 103 as a gripping member and a base member 110, as shown in FIG. 2. The gripping finger 103 has two V-character pieces 103v of substantial V shape that are opened or closed when the top end portions are widened by pulling or restoring one end in accordance with a translation displacement to grip a minute object.

The gripping finger 103 expanded as shown in FIG. 3 is symmetrical with respect to a dotted line O, and is bent downward on the paper along a broken line L, bent upward on the paper along a broken line M, and bent downward on the paper along a broken line N to form the gripping finger 103 as shown in FIG. 4. The gripping finger 103 has the shared portion 103g in the central portion, each leg portion 103f of the gripping finger 103 being formed with a slit (first slit) 103s in the center and a cut-away end portion 103t on either outer side.

The shared portion 103g of the gripping finger 103 is formed with a slip-off prevention piece 103n having a larger diameter than the diameter of a bore 110e of the base member 110 and with a bore 103e punched in the central portion.

The base member 110 is like a plain washer, and has the bore 110e punched in the center and two protrusion pieces 110t provided around the outer circumference, as shown in FIG. 5. The base member 110 is provided with two notches 110c as a first engagement portion that are engaged by holding the leg portions 103f of the finger 103, as shown in FIG. 5. The protrusion piece 110t is provided with a slit 110s (second slit) and formed with a circular slit 110g continuous to the slit 110s and extending to a ring portion of the base member 110.

The width of the slits 110s, 110g is formed in such an extent that if the protrusion piece 110t is pressed by holding it from side faces thereof, whereby the protrusion piece 110t is compressed due to a spring force, and the protrusion piece 110t is inserted into a groove 145e of the holder member 145 as will be described later and released holding, the protrusion piece 110t can be restored due to a spring force and engaged in the groove 145e.

The circular slit 110g may not be needed depending on the magnitude of spring force.

The notch 110c of the base member 110 has a substantial T shape as seen in a plan view, and is wider in depth than an opening. The width of the notch 110c in depth is formed slightly smaller than the width of an end portion 103t of the gripping finger 103 at the top end. Thereby, the end portion 103t is inserted into the notch 110c by carrying both sides of the leg portion 103f of the gripping finger 103 and abutted against the depth portion of the notch 110c, and then the leg portion 103f is released to engage the end portion 103t with the notch 110c. In this manner, the finger unit 101 is formed.

The conversion portion 120 has a moving nut 126 as a movement portion that is mated with the male screw 22a of the screw axis 22 and has a female screw 126a on the outer face of a hollow portion formed by cutting the rear end, in which the rotation of the shaft 12a of the motor 12 is converted into a translation displacement of the moving nut 126.

The moving nut 126 has a rectangular outer shape to prevent rotation and is formed with a cylindrical hollow portion 126e at the front end.

The connection portion 130 has a cylindrical magnet 128 as a cylindrical magnetic member made of rare earth magnet, in which the cylindrical magnet 128 has an outer diameter slightly smaller than the bore diameter of the hollow portion 126e in the moving nut 126, with one end portion being inserted into the hollow portion 126e and fixed by adhesives, a connecting nut 132 as a connection member made of magnetic substance such as iron steel that is magnetically adsorbed and fixed on the other end face of the cylindrical magnet 128, and a center screw 134 inserted into the bore 103e of the shared portion 103g in the gripping finger 103 and screwed into the tapped hole 132e (see FIG. 6) of the connecting nut 132.

In the case where the moving nut 126 is made of magnetic substance, it is not required that one end portion of the cylindrical magnet 128 is fixed to the hollow portion 126e of the moving nut 126 by adhesives. Because it is fixed by adsorption due to a magnetic suction force of the cylindrical magnet 128.

The connecting nut 132 is formed like an inverse T shape in cross section and is provided with a cylindrical portion 132a and an interposing portion 132d having two flat interposing faces 132c opposed to each other to be easily turned by the spanner, as shown in FIG. 6.

The center screw 134 as the screw member is provided with a head portion 134a having a minus sign shaped groove 134c, a screw portion 134d mated into the tapped hole 132e of the connecting nut 132, and a cylindrical screw preventing portion 134f provided between the head portion 134a and the screw portion 134d, the screw preventing portion 134f having a larger diameter than the screw portion 134d and having a greater length than the thickness of gripping finger 101 at the end, as shown in FIG. 7.

The screw preventing portion 134f is formed to be slightly smaller than the diameter of the bore 103e in the gripping finger 103. This is because the screw preventing portion 134f is inserted into the bore 103e of the gripping member 103, and is movable within the bore 103e.

The groove 134c of the center screw 134 may be plus sign shaped.

The case portion 140 is formed of a lid 43, and a holder member 145 engaged with a left end face of the case 41 and holding the finger unit 101 detachably.

The holder member 145 has formed a top end hollow portion 145m for receiving the cylindrical magnet 128 and the center screw 134 in the central portion, which contains the connection portion 130 and is formed like a barrel with substantially trapezoidal shape in cross section, and a rear end hollow portion 145h for receiving the moving nut 126, as shown in FIGS. 1 and 8.

The holder member 145 is provided, at the top end portion, with a fixing portion 145f, which is formed to be hollow and cylindrical with substantially concave shape in cross section and fixing the base member 110 of the finger unit 101. The fixing portion 145f is provided with two grooves 145e as the second engagement portion, into which the protrusion piece 110t of the base member 110 is inserted and fitted.

In a state where the protrusion piece 110t is fitted into the groove 145e, a top end of the protrusion piece 110t is slightly protruded out of the outer circumference of the holder member 145, as shown in FIG. 1.

The gripper 100 as constituted above can perform the substantially same operation as the conventional gripper.

The assembly of the gripper as constituted above will be described below with reference to FIGS. 1 to 9.

Constitution of Assembly Jig

Figure 9A:
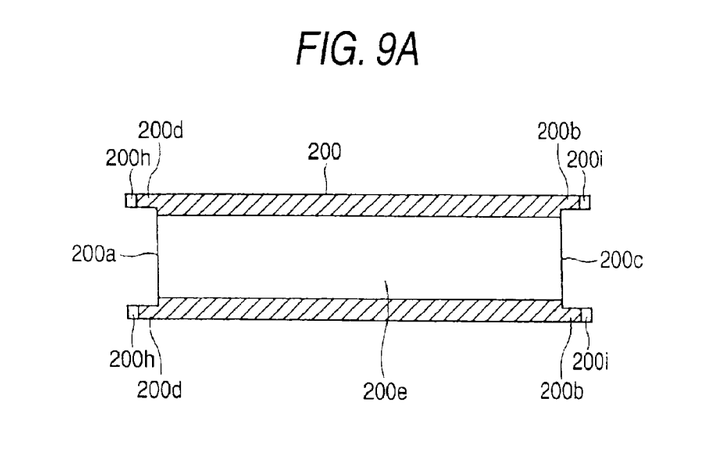
FIGS. 9(a) through 9(c) are explanatory views showing an adjuster that is an assembly jig.
Figure 9B:
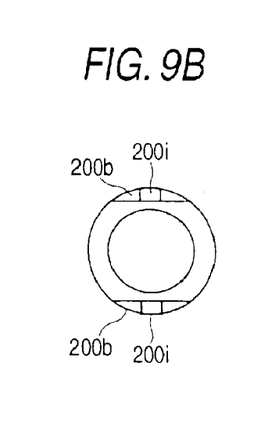
Figure 9C:
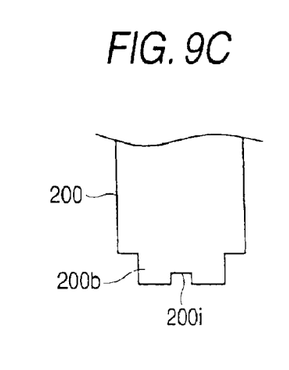

Referring to FIG. 9, an assembly jig will be described below. FIG. 9 is a front cross-sectional view (A), a right side view (B) and a plan view (C) of an adjuster for attaching the finger unit to the finger holder.

In FIG. 9, the adjuster 200 is a cylindrical member having a bore 200e, having two protruding portions 200b and 200d on the upper and lower sides at the ends 200a and 200c, in which the protruding portions 200b and 200d are provided with the grooves 200i and 200h for interposing two protrusion pieces 110t of the base member 110 in the finger unit 101.

A groove 200h has a slightly smaller width than the protrusion piece 110t of the base member 110, and is formed corresponding to the position of the protrusion piece 110t. A groove 200i is formed to be a slightly smaller width than the groove 200h.

Attaching or Detaching the Finger Unit 101

An operation of attaching or detaching the finger unit 101 to or from the holder member 145 using the adjuster 200 will be described below.

First of all, when the finger unit 101, the connecting nut 132 and the center screw 134 are not attached in FIG. 1, and when the finger unit 101 is in a state of FIG. 2, the screw portion 134d of the center screw 134 is passed through the bore 103e of the shared portion 103g in the gripping finger 103 and mated into the tapped hole 132e of the connecting nut 132, as shown in FIG. 3.

While the bore 200e of the adjuster 200 is being put on the gripping finger 103 from the above, the groove 200h of the adjuster 200 is slidingly pressed on the side face of the protrusion piece 110t of the base member 110. Since a pressing force is exerted to interpose the protrusion piece 110t, the protrusion pieces 110t are elastically deformed toward each other under the pressure of the adjuster 200, thereby narrowing the gap between the slits 110s, so that the width of the protrusion piece 110t is equal to that of the groove 200h of the adjuster 200.

And the protrusion piece 110t of the base member 110 is engaged in the groove 200h. In this engaged state, the protrusion piece 110t is fitted into the groove 145e of the holder member 145, and interposed under a predetermined compression force, thereby attaching the finger unit 101 on the holder member 145. Since the compression force of the groove 200h of the adjuster 200 is released by fitting the protrusion piece 110t into the groove 145e of the holder member 145, the groove 200h of the adjuster 200 is easily detached from the protrusion piece 110t of the base member 110. At the same time, an end face of the connecting nut 132 is magnetically adsorbed onto an end face of the cylindrical magnet 128, thereby completing the gripper 100 as shown in FIG. 1.

On the other hand, in the gripper 100 as shown in FIG. 1, the protrusion piece 110t is subjected to a pressure with one end 200c of the adjuster 200 in contact with the finger unit 101, and further compressed, while sliding it on the side face of the protrusion piece 110t of the base member 110, to be engaged in the groove 200i of the adjuster 200, whereby the protrusion piece 110t is disengaged from the groove 145e of the holder member 145.

If the adjuster 200 is lifted, the center screw 134 and the connecting nut 132 connected to the finger unit 101 are lifted at the same time, and an end face of the connecting nut 132 is released from the magnetic adsorption with an upper face of the cylindrical magnet 128, whereby the finger unit 101, the center screw 134 and the connecting nut 132 can be easily removed from a main body of the gripper 100.

In lifting the finger unit 101 by means of the adjuster. 200, the slip-off prevention piece 103n of the finger 103 abuts against the surface of the base member 110 to act as a stopper. Accordingly, the shared portion 103g of the finger 103 is restrained in the amount of movement, thereby preventing the V-character sides 103v of the gripping finger 103 from being contacted and pressed to deform the V-character sides 103v.

The members described in this specification are only illustrative, and the invention is not limited to those members.

Industrial Applicability

As described above, the gripper of the present invention is suitable for exchanging the gripping member simply.

What is claimed is:

1. A gripper comprising:
   an actuator for actuating a movement portion which translates;
   a gripping member comprising: two sides of a substantial V shape; and a shared portion joining first ends of said two sides;

a holder member comprising: a base member including a first engagement portion for engaging second ends of said two sides of said gripping member thereto; a second engagement portion for engaging said base member detachably thereto; and a hollow portion, which is penetrated; and a magnetic member made of a permanent magnet, wherein:

an outer end of the magnetic member is connected to one end of said movement portion;

an inner end of the magnetic member is magnetically connected to the shared portion of said gripping member; and the magnetic member is inserted into said hollow portion of said holder member.

2. The gripper according to claim 1, wherein a first slit is defined at each of the second ends of said gripping member.

3. The gripper according to claim 1, further comprising a connecting nut arranged between the shared portion of the gripping member and the magnet, wherein the connecting nut is formed of a magnetic substance so that it is attracted to the magnetic member.

4. The gripper according to claim 3, further comprising a screw connecting the shared portion of the gripping member to the connecting unit.

5. A gripper comprising:

an actuator for actuating a movement portion which translates;

a gripping member comprising: two sides of a substantial V shape; and a shared portion joining first ends of said two sides;

a base member comprising: a bore punched in the central portion thereof; an engagement portion for engaging a second end portion of said gripping member thereto; and at least two protrusion pieces on an outer circumference;

a holder member comprising at least two grooves for engaging said protrusion pieces of said base member detachably therewith, and a hollow portion, which is penetrated;

a magnetic member, comprising a permanent magnet, inserted into said hollow portion of said holder member so that an outer end of which is connected to said movement portion; and a connection member comprising: a front end is adsorbed magnetically to an inner end of said magnetic member; and a back end connected to the shared portion of said gripping member, wherein the connection member is inserted into said hollow portion of said holder member.

6. The gripper according to claim 5, further comprising a screw member, wherein said connection member has a tapped hole at the back end thereof; and wherein the screw member is inserted into a bore of the shared portion of said gripping member and is tightened into the tapped hole of said connection member.

7. The gripper according to claim 6, wherein said screw member is cylindrical, and further comprises:

a head portion comprising a minus sign shaped or plus sign shaped groove;

a screw portion tightened into the tapped hole of said connection member; and a screw preventing portion having a diameter larger than said screw portion and smaller than said head portion and having a length greater than the thickness of said shared portion of said gripping member, said screw preventing portion provided between said head portion and said screw portion.

8. The gripper according to claim 5, wherein said protrusion pieces of said base member define second slits.

9. The gripper according to claim 5, wherein said shared portion of said gripping member has a slip-off prevention piece having a larger diameter than the diameter of the bore of said base member.

10. The gripper according to claim 5, wherein a first slit is defined at the second end portion of said gripping member 11. A method for manufacturing the gripper comprising: an actuator for actuating a movement portion which translates; a gripping member comprising at least two sides of substantial V shape, and a shared portion joining first end of said two sides; a base member comprising a bore punched in the central portion thereof, an engagement portion for engaging a second end portion of said gripping member thereto, and at least two protrusion pieces on an outer circumference; a holder member comprising at least two grooves for engaging said protrusion pieces of said base member detachably therewith, and a hollow portion, which is penetrated; a magnetic member, comprising a permanent magnet, inserted into said hollow portion of said holder member, so that an outer end of which is connected to said movement portion; and a connection member comprising a front end adsorbed magnetically to a back end of said magnetic member; and a second end connected to the shared portion of said gripping member, wherein the connection member is inserted into said hollow portion of said holder member, the method comprising:

engaging the protrusion pieces of said base member with the grooves of said holder member by pressing side surfaces of the protrusion pieces of said base member with a first groove provided on the side face of a cylindrical member having a hollow portion into which said gripping member can be inserted.

* * * * *